United States Patent
Zhang et al.

(10) Patent No.: US 10,882,462 B2
(45) Date of Patent: Jan. 5, 2021

(54) VEHICLE-MOUNTED DISPLAY SCREEN DEVICE AND VEHICLE

(71) Applicant: BYD COMPANY LIMITED, Guangdong (CN)

(72) Inventors: Xiaoru Zhang, Shenzhen (CN); Qing Cai, Shenzhen (CN); Sheng Bai, Shenzhen (CN); Xiaofang Xu, Shenzhen (CN); Juhua Du, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 35 days.

(21) Appl. No.: 16/465,077

(22) PCT Filed: Nov. 17, 2017

(86) PCT No.: PCT/CN2017/111693
§ 371 (c)(1),
(2) Date: May 29, 2019

(87) PCT Pub. No.: WO2018/099278
PCT Pub. Date: Jun. 7, 2018

(65) Prior Publication Data
US 2019/0291657 A1 Sep. 26, 2019

(30) Foreign Application Priority Data
Nov. 30, 2016 (CN) .......................... 2016 1 1086395

(51) Int. Cl.
*H05K 7/00* (2006.01)
*B60R 11/02* (2006.01)
*B60R 11/00* (2006.01)

(52) U.S. Cl.
CPC .......... *B60R 11/0235* (2013.01); *B60R 11/02* (2013.01); *B60R 2011/0005* (2013.01);
(Continued)

(58) Field of Classification Search
CPC .................................................. B60R 11/0235
See application file for complete search history.

(56) References Cited

U.S. PATENT DOCUMENTS

| 7,913,359 B2 * | 3/2011 | Duan .................... E05F 1/1207 16/330 |
| 7,969,714 B2 | 6/2011 | Wang |

(Continued)

FOREIGN PATENT DOCUMENTS

| CN | 201090626 Y | 7/2008 |
| CN | 101246753 A | 8/2008 |

(Continued)

OTHER PUBLICATIONS

English Translation of International Search Report from PCT/CN2017/111693 dated Feb. 14, 2018 (2 pages).

*Primary Examiner* — Jerry Wu
(74) *Attorney, Agent, or Firm* — Calfee, Halter & Griswold LLP

(57) ABSTRACT

A vehicle-mounted display screen device includes a display screen, a motor and a transmission system. The motor drives the display screen to rotate via the transmission system. The transmission system includes a first shaft, a second shaft, a first semi-clutch, a second semi-clutch and an elastic component, the first shaft is coaxial with the second shaft, the first semi-clutch is slidably sleeved on the first shaft axially, the second semi-clutch is connected to the second shaft, a first tooth is formed on an end surface of the first semi-clutch facing the second semi-clutch, a second tooth is formed on an end surface of the second semi-clutch facing the first semi-clutch, and the elastic component applies axial elastic force to the first semi-clutch to enable the first tooth and the second tooth to be engaged.

18 Claims, 7 Drawing Sheets

(52) U.S. Cl.
CPC ................ *B60R 2011/0085* (2013.01); *B60R 2011/0092* (2013.01)

(56) References Cited

U.S. PATENT DOCUMENTS

| | | |
|---|---|---|
| 2006/0060439 A1 | 3/2006 | Shirokoshi et al. |
| 2010/0206109 A1 | 8/2010 | Kissel et al. |
| 2011/0166782 A1 | 7/2011 | Watanabe |
| 2013/0147847 A1* | 6/2013 | Koseki ................ B60R 11/0235 345/660 |

FOREIGN PATENT DOCUMENTS

| | | |
|---|---|---|
| CN | 201211869 Y | 3/2009 |
| CN | 202728121 U | 2/2013 |
| CN | 103558900 A | 2/2014 |
| CN | 203588117 U | 5/2014 |
| CN | 203733416 U | 7/2014 |
| CN | 104670112 A | 6/2015 |
| CN | 105150951 A | 12/2015 |
| EP | 134620 A2 | 3/1985 |
| JP | H10148220 A | 6/1998 |

* cited by examiner

VEHICLE-MOUNTED DISPLAY SCREEN DEVICE AND VEHICLE

CROSS-REFERENCE TO RELATED APPLICATIONS

This application the U.S. national phase entry of PCT Application No. PCT/CN2017/111693, filed Nov. 17, 2017, which claims priority to and benefits of Chinese Patent Application Serial No. 201611086395.7, filed with the China National Intellectual Property Administration on Nov. 30, 2016. The entire content of the above-referenced application is incorporated herein by reference.

FIELD

The present disclosure relates to a vehicle-mounted display screen device and also relates to a vehicle with the vehicle-mounted display screen device.

BACKGROUND

With the advent of the intelligent era, function applications of vehicle multimedia are more and more extensive, and the human-machine operation of vehicle multimedia receives more and more attention as a focus of product design.

Nowadays, vehicle-mounted multimedia display screens become bigger and bigger. Common vehicle-mounted multimedia display screens comprise a horizontal screen and a vertical screen, and arrangement modes are related to interior decorations of vehicles. The existing vehicle-mounted multimedia display screen is fixedly mounted on a cab dashboard in a horizontal screen state or a vertical screen state, but the horizontal screen and the vertical screen cannot be switched at will, so that operating habits of users for different applications cannot be met, causing poor user experience.

SUMMARY

The present disclosure relates to a vehicle-mounted display screen device which can realize switching between a horizontal screen and a vertical screen and has an overload protection function.

In one aspect, the present disclosure provides a vehicle-mounted display screen device, including a display screen, a motor and a transmission system. The motor drives the display screen to rotate via the transmission system. The transmission system includes a first shaft, a second shaft, a first semi-clutch, a second semi-clutch and an elastic component, the first shaft is coaxial with the second shaft, the first semi-clutch is slidably sleeved on the first shaft axially, the second semi-clutch is connected to the second shaft, a first tooth is formed on an end surface of the first semi-clutch facing the second semi-clutch, a second tooth is formed on an end surface of the second semi-clutch facing the first semi-clutch, and the elastic component applies axial elastic force to the first semi-clutch to enable the first tooth and the second tooth to be engaged.

In another aspect, the present disclosure provides a vehicle, including the above-mentioned vehicle-mounted display screen device.

Through the above technical solution, on the one hand, the display screen can rotate relative to a vehicle dashboard, thereby realizing the switching between a horizontal screen and a vertical screen, better meeting the operating habits of users for different applications, and improving the user experience. On the other hand, by arranging the clutch with an overload protection function in the transmission system, when an overload condition of the system occurs, power transmission can be interrupted in time, thereby preventing the motor and the transmission system from being damaged and prolonging the service life of the vehicle-mounted display screen device.

Other features and advantages of the present disclosure are described in detail in the Detailed Description part below.

BRIEF DESCRIPTION OF THE DRAWINGS

The accompanying drawings are used to provide further understanding of the present disclosure, constitute a part of this specification, and are used, together with the following specific implementations, to explain the present disclosure, but do not constitute limitations to the present disclosure. In the accompanying drawings.

DESCRIPTION OF REFERENCE NUMERALS

| 1 | Fixed rack | 2 | Motor |
| --- | --- | --- | --- |
| 3 | Speed reducer | 31 | Output shaft |
| 4 | First shaft | 41 | Annular boss |
| 42 | Central shaft hole | 5 | Circlip for shaft |
| 6 | First bearing | 7 | Second bearing |
| 8 | Positioning shaft sleeve | 9 | Elastic component |
| 10 | First semi-clutch | 101 | First tooth |
| 11 | Second semi-clutch | 111 | Second tooth |
| 12 | Second shaft | 13 | First contact switch |
| 14 | Second contact switch | 15 | Contact terminal |
| 16 | Bracket behind screen | 17 | Display screen |

DETAILED DESCRIPTION

Specific implementations of the present disclosure are described in detail below with reference to accompanying drawings. It should be understood that the specific implementations described herein are merely used to describe and explain the present disclosure rather than limit the present disclosure.

Figure 4:
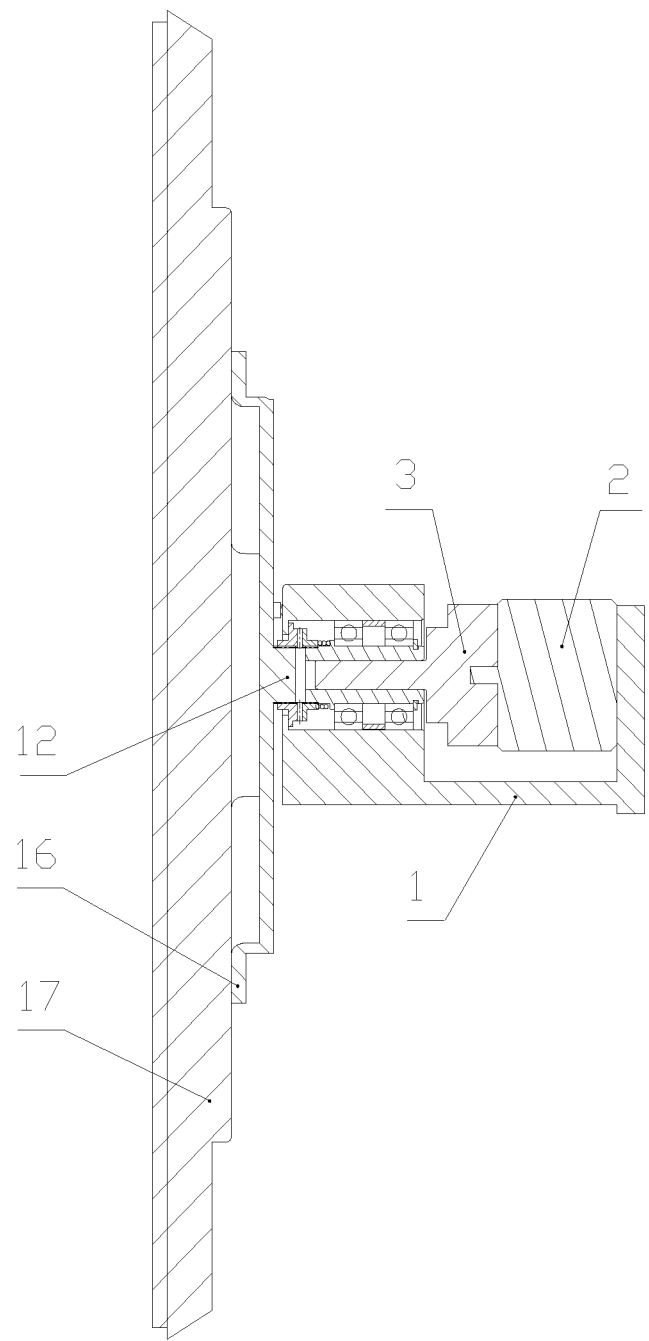
FIG. 4 is an AA cross-sectional view of FIG. 3.
Figure 5:
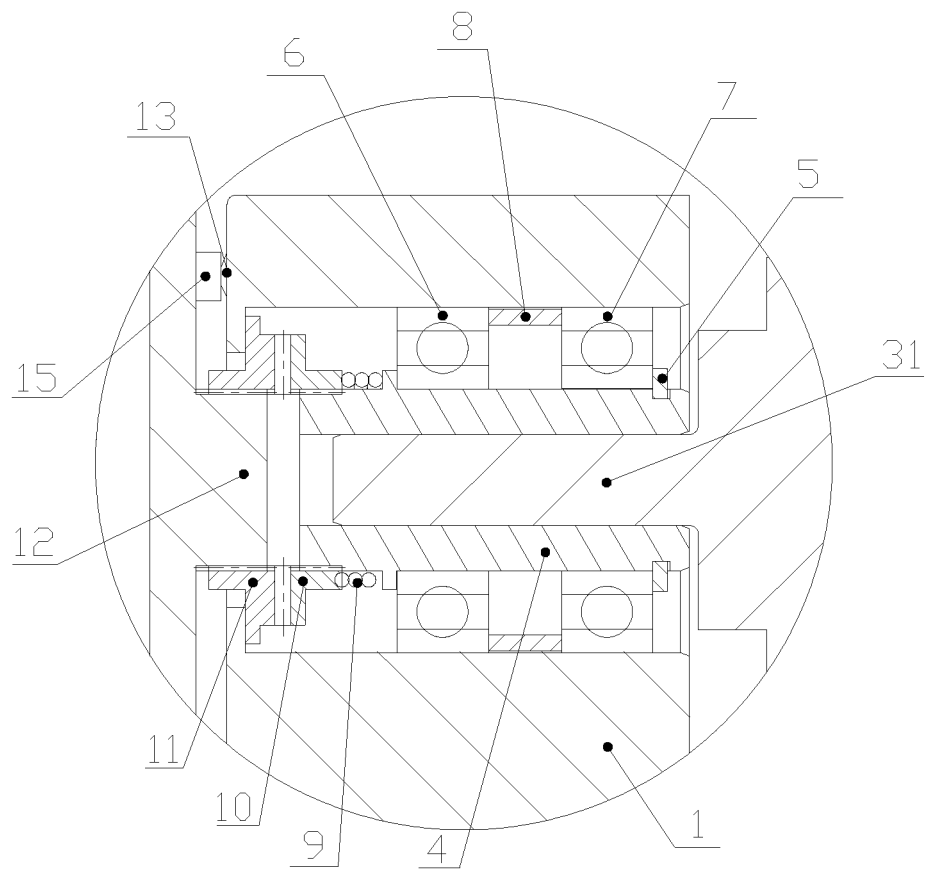
FIG. 5 is a partial enlarged view of FIG. 4.
Figure 6:
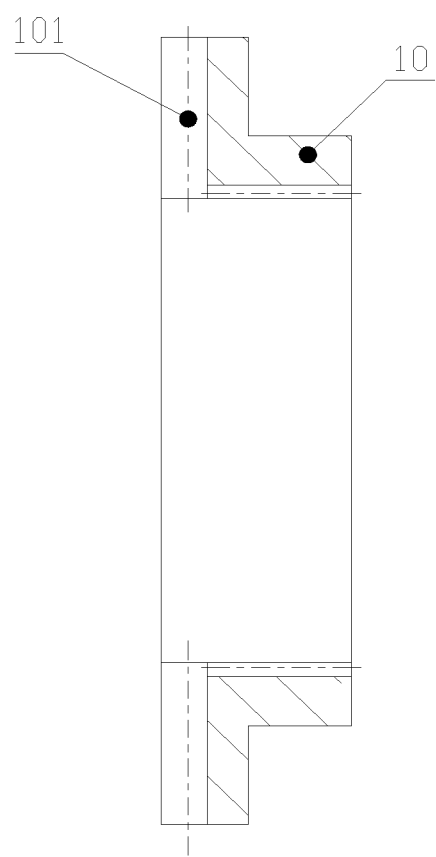
FIG. 6 is a cross-sectional view of a first semi-clutch.
Figure 7:
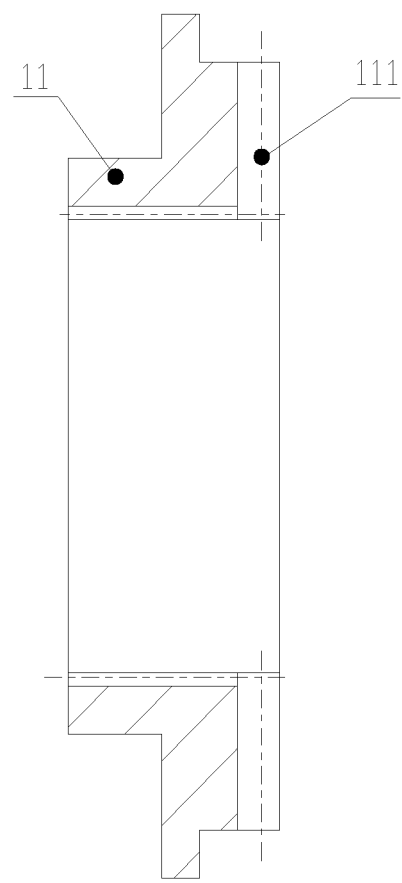
FIG. 7 is a cross-sectional view of a second semi-clutch.

As shown in FIG. 1 to FIG. 9, according to a first aspect of the present disclosure, a vehicle-mounted display screen device is provided. The vehicle-mounted display screen device includes a display screen 17, a motor 2 and a transmission system. The motor 2 drives the display screen 17 to rotate via the transmission system, so that the display screen 17 can be switched between a horizontal screen state and a vertical screen state. The transmission system includes a first shaft 4, a second shaft 12 and a clutch, and the torque is transmitted between the first shaft 4 and the second shaft 12 via the clutch. As shown in FIG. 5 to FIG. 7, the clutch includes a first semi-clutch 10, a second semi-clutch 11 and an elastic component 9. The elastic component 9 is fitted over the first shaft 4, the first shaft 4 is coaxial with the second shaft 12, the first semi-clutch 10 is slidably sleeved on the first shaft 4 axially, the second semi-clutch 11 is connected to the second shaft 12, a first tooth 101 is formed on an end surface of the first semi-clutch 10 facing the second semi-clutch 11, and a second tooth 111 is formed on an end surface of the second semi-clutch 11 facing the first semi-clutch 10.

Under normal working conditions, the elastic component 9 applies elastic force along the axial direction of the first shaft 4 to the first semi-clutch 10 to press the first semi-clutch 10 and the second semi-clutch 11 to each other, the first tooth 101 and the second tooth 111 are engaged and do not relatively rotate, and the clutch is in an engaged state. Under the condition of system overload (for example, an occupant twists the display screen 17 by hand), at this moment, the axial component of the tooth surface pressing force of the first tooth 101 and the second tooth 111 is greater than the axial elastic force applied by the elastic component 9 to the first semi-clutch 10, the first semi-clutch 10 axially moves away from the second semi-clutch 11 to be disengaged from the second semi-clutch 11, the clutch is in a disengaged state, and the torque transmission is interrupted, thereby forming overload protection for the system. After the overload condition disappears, the first semi-clutch 10 is reset again under the action of the elastic component 9 and is engaged with the second semi-clutch 11 again, and the clutch returns to the engaged state, so that the torque can be normally transmitted.

Through the above technical solution, on the one hand, the display screen 17 can rotate relative to a vehicle dashboard, thereby realizing the switching between a horizontal screen and a vertical screen, better meeting the operating habits of users for different applications, and improving the user experience. On the other hand, by arranging the clutch with an overload protection function in the transmission system, when the overload condition of the system occurs, the power transmission can be interrupted in time, thereby preventing the motor 2 and the transmission system from being damaged and prolonging the service life of the vehicle-mounted display screen device.

In the present disclosure, the first tooth 101 and the second tooth 111 can have various proper tooth shapes as long as the tooth surface pressing force has an axial component. For example, the tooth shapes of the first tooth 101 and the second tooth 111 can be trapezoidal, involute, triangular, or the like.

In the present disclosure, the first semi-clutch 10 can be connected to the first shaft 4 via multiple proper modes. For example, as shown in FIG. 5 and FIG. 6, the first semi-clutch 10 can be connected to the first shaft 4 via splines. For another example, the first shaft 4 can have a non-circular cross section convenient for transmitting the torque, and the first semi-clutch 10 is sleeved on the first shaft 4 in a matched mode.

In the present disclosure, the second semi-clutch 11 can be connected to the second shaft 12 via multiple proper modes. For example, as shown in FIG. 5 and FIG. 7, the second semi-clutch 11 can be connected to the second shaft 12 via splines. For another example, the second semi-clutch 11 can be connected to the second shaft 12 via interference fit. For another example, the second semi-clutch 11 can be directly welded to the second shaft 12.

Figure 8:
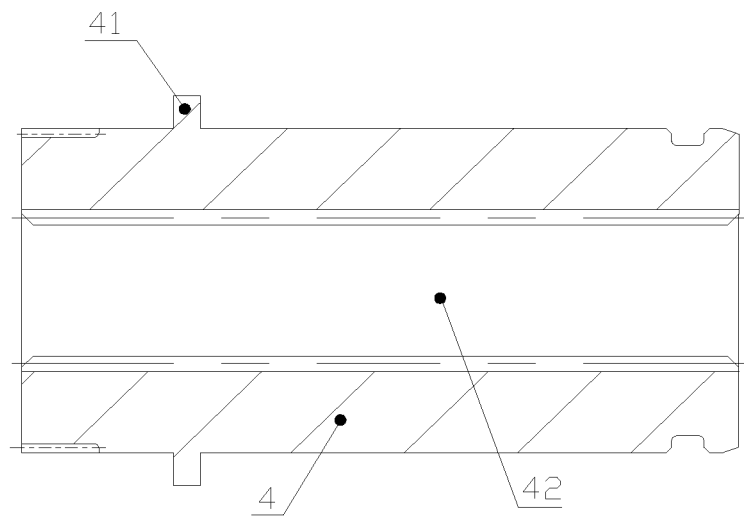
FIG. 8 is a cross-sectional view of a first shaft.

In the present disclosure, in order to facilitate the positioning of the elastic component 9, as shown in FIG. 5 and FIG. 8, an annular boss 41 extending along a circumferential direction of the first shaft 4 is formed on the first shaft 4, and two ends of the elastic component 9 are respectively supported on the first semi-clutch 10 and the annular boss 41. Specifically, the first semi-clutch 10 can be connected to the elastic component 9 via splines, one end of the elastic component 9 is unilaterally limited via the annular boss 41 of the first shaft 4, and the other end of the elastic component 9 is connected to the end surface of the first semi-clutch 10. For example, the elastic component 9 is a spring or an elastic sleeve fitted over the first shaft 4.

In consideration of the driving and riding experience of an occupant, the display screen 17 can rotate at a relatively low rotation speed. Therefore, as shown in FIG. 1, FIG. 2, FIG. 4 and FIG. 5, a speed reducer 3 can be disposed between the motor 2 and the display screen 17. Under such condition, as an embodiment, the first shaft 4 can be an output shaft 31 of the speed reducer 3, that is, the first shaft 4 and the output shaft 31 of the speed reducer 3 are the same shaft, the second shaft 12 can be fixed on the display screen 17, and then, the second shaft 12 drives the display screen 17 to rotate. As another embodiment, the first shaft 4 and the output shaft 31 of the speed reducer 3 are respectively two shafts, the first shaft 4 is in transmission connection with the output shaft 31 of the speed reducer 3, the second shaft 12 can be fixed on the display screen 17, and then, the second shaft 12 drives the display screen 17 to rotate. In the two embodiments, the first shaft 4 is a driving shaft, and the second shaft 12 is a driven shaft. In other embodiments not shown, the first shaft 4 can be a driven shaft, and the second shaft 12 can be a driving shaft. The embodiments are all within the protection scope of the present disclosure.

In the present disclosure, the speed reducer 3 can be of any proper type. However, in order to enable the display screen 17 to rotate at a very low rotation speed, the speed reducer 3 is required to have a larger transmission ratio. Therefore, the present disclosure preferably adopts a small-tooth-difference planetary gear reducer which not only ensures a larger transmission ratio, but also ensures that the speed reducer is simple and compact in structure, small in volume and light in weight, so that the transmission is smoother, the noise is lower and the bearing capability is better.

In one embodiment, the first shaft 4 can be in transmission connection with the output shaft 31 of the speed reducer 3 via multiple proper modes. For example, as shown in FIG. 8, the first shaft 4 can be provided with a central shaft hole 42, an internal spline is formed on a hole wall of the central shaft hole 42, an external spline engaged with the internal spline is disposed on the output shaft 31 of the speed reducer 3, and the output shaft 31 of the speed reducer 3 is connected to the first shaft 4 via splines so as to realize power transmission. For another example, the first shaft 4 can be provided with a central shaft hole 42, and the first shaft 4 is in interference fit to the output shaft 31 of the speed reducer 3 via the central shaft hole 42. For another example, the first shaft 4 can be provided with a central shaft hole 42, the first shaft 4 is sleeved on the output shaft 31 of the speed reducer 3 via the central shaft hole 42, and a positioning pin penetrates via the first shaft 4 along a radial direction and is inserted into the output shaft 31.

As shown in FIG. 4 and FIG. 5, the vehicle-mounted display screen device of the present disclosure may further include a fixed rack 1, the motor 2 and the speed reducer 3 that are mounted on the fixed rack 1, the fixed rack 1 can be provided with mounting holes, bearings can be disposed in the mounting holes, and the first shaft 4 is supported on the fixed rack 1 via the bearings. By utilizing the bearings to support the first shaft 4, the structural stability of the first shaft 4 can be enhanced, bending deformation of the first shaft 4 can be prevented, and the stability and reliability of power transmission can be ensured.

As shown in FIG. 5, the bearings may include a first bearing 6 and a second bearing 7 which are disposed in a spaced manner along the axial direction of the first shaft 4, the annular boss 41 extending along the circumferential direction of the first shaft 4 can be formed on the first shaft 4, one side of the first bearing 6 away from the second bearing 7 can abut against the annular boss 41, a positioning shaft sleeve 8 can be disposed between the first bearing 6 and the second bearing 7, and one side of the second bearing 7 away from the first bearing 6 can be fixed via a circlip 5 for the shaft. By adopting the first bearing 6 and the second bearing 7 to realize double-bearing support, an axial load can be borne, a radial load can also be borne, and the transmission system has sufficient support strength and rigidity, thereby providing guarantee for stability and vibration resistance of the whole device. Specifically, both the first bearing 6 and the second bearing 7 can be deep groove ball bearings, so that the axial load can be borne, and the radial load can also be borne.

Figure 9:
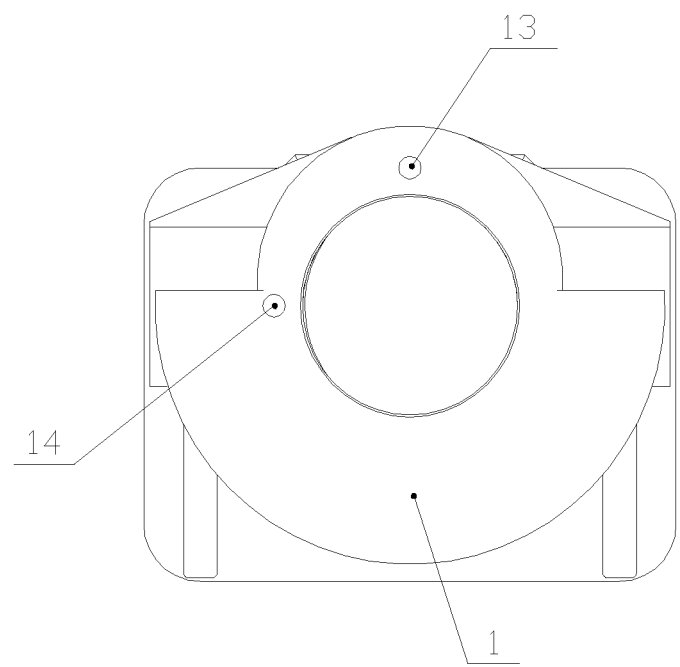
FIG. 9 is a front view of a fixed rack.

The vehicle-mounted display screen device of the present disclosure can have any proper control strategy. As an embodiment, as shown in FIG. 5 and FIG. 9, the fixed rack 1 can be provided with a first contact switch 13 and a second contact switch 14, and a contact terminal 15 is fixed on the display screen 17; when the display screen 17 is in a horizontal screen state, the contact terminal 15 is in contact with the first contact switch 13; and when the display screen 17 is in a vertical screen state, the contact terminal 15 is in contact with the second contact switch 14. The vehicle-mounted display screen device may further include a motor controller. After receiving a display screen rotating instruction, the motor controller is used for firstly judging whether the display screen 17 is in a horizontal screen state or a vertical screen state according to the conducting condition of the two contact switches; if the display screen 17 is in a horizontal screen state (the contact terminal 15 is in contact with the first contact switch 13), the motor controller controls the motor 2 to rotate forward to drive the display screen 17 to clockwise rotate, after the display screen 17 rotates for 90 degrees, the contact terminal 15 is in contact with the second contact switch 14 to send a stop signal, and then, the motor 2 stops rotating and is locked in place, thereby completing switching from the horizontal screen to the vertical screen; otherwise, if the display screen 17 is in a vertical screen state (the contact terminal 15 is in contact with the second contact switch 14), the motor controller controls the motor 2 to rotate backward to drive the display screen 17 to counterclockwise rotate, after the display screen 17 rotates for 90 degrees, the contact terminal 15 is in contact with the first contact switch 13 to send a stop signal, and then, the motor 2 stops rotating and is locked in place, thereby completing switching from the vertical screen to the horizontal screen. It should be noted that the terms "forward rotation", "backward rotation", "clockwise", "counterclockwise" and the like are only used for representing two opposite directions and do not represent a specific direction.

Figure 1:
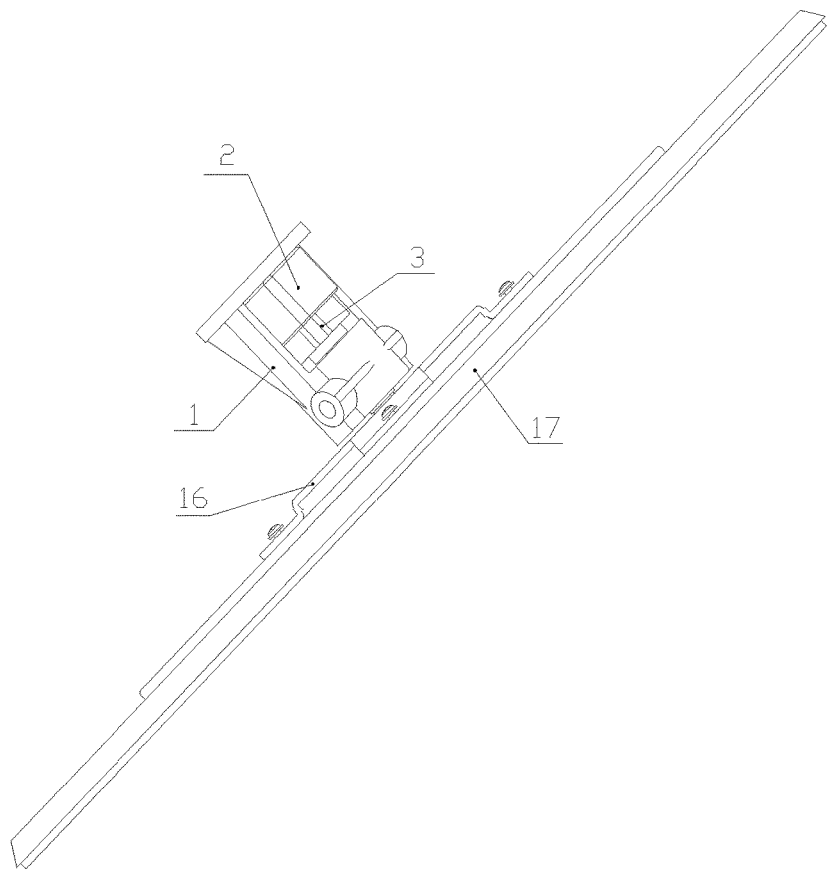
FIG. 1 is a three-dimensional view of a vehicle-mounted display screen device according to one embodiment of the present disclosure.
Figure 2:
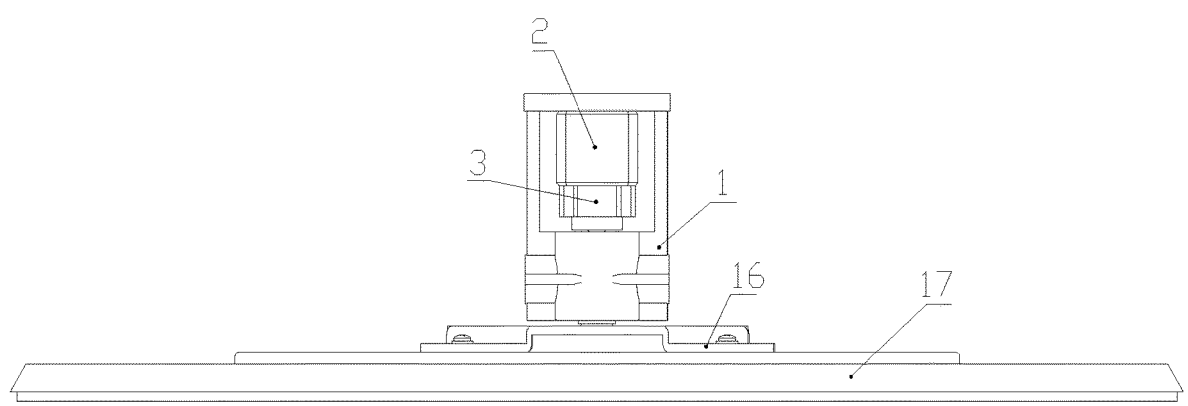
FIG. 2 is a top view of a vehicle-mounted display screen device according to one embodiment of the present disclosure.
Figure 3:
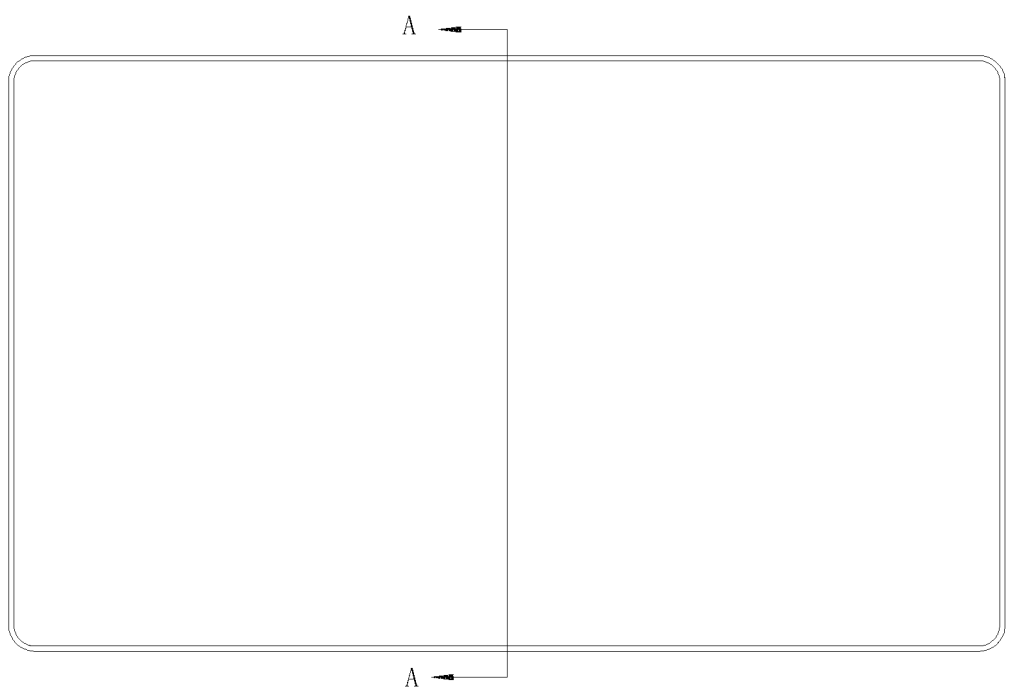
FIG. 3 is a front view of a vehicle-mounted display screen device according to one embodiment of the present disclosure.

As shown in FIG. 1, FIG. 2 and FIG. 4, the vehicle-mounted display screen device of the present disclosure may further include a bracket 16 behind the screen, fixed on the back surface of the display screen 17, the second shaft 12 and the bracket 16 behind the screen can be integrally formed, and the contact terminal 15 can be fixed on the bracket 16 behind the screen.

According to another aspect of the present disclosure, a vehicle is further provided. The vehicle is provided with the vehicle-mounted display screen device of the present disclosure.

Although specific implementations of the present disclosure are described in detail above with reference to accompanying drawings, the present disclosure is not limited to specific details in the foregoing implementations. Various simple variations can be made to the technical solutions of the present disclosure within the scope of the technical idea of the present disclosure, and such simple variations all fall within the protection scope of the present disclosure.

It should be further noted that the specific technical features described in the foregoing specific implementations can be combined in any appropriate manner provided that no conflict occurs. To avoid unnecessary repetition, various possible combination manners will not be otherwise described in the present disclosure.

In addition, various different implementations of the present disclosure may alternatively be combined randomly. Such combinations should also be considered as the content disclosed in the present disclosure provided that these combinations do not depart from the idea of the present disclosure.

What is claimed is:

1. A vehicle-mounted display screen device, comprising: a display screen; a motor, and a transmission system, wherein the motor drives the display screen to rotate via the transmission system, the transmission system comprises a first shaft, a second shaft, a first semi-clutch, a second semi-clutch and an elastic component, the first shaft is coaxial with the second shaft, the first semi-clutch is slidably sleeved on the first shaft axially, the second semi-clutch is connected to the second shaft, a first tooth is formed on an end surface of the first semi-clutch facing the second semi-clutch, a second tooth is formed on an end surface of the second semi-clutch facing the first semi-clutch, and the elastic component applies axial elastic force to the first semi-clutch to enable the first tooth and the second tooth to be engaged with each other; the transmission system further comprises a speed reducer, the motor is in transmission connection with the speed reducer, the first shaft is an output shaft of the speed reducer, and the second shaft is fixed on the display screen; and a fixed rack, the motor and the speed reducer are mounted on the fixed rack; and the fixed rack is provided with a first contact switch and a second contact switch, and a contact terminal is fixed on the display screen; the contact terminal is in contact with the first contact switch when the display screen is in a horizontal screen state; and the contact terminal is in contact with the second contact switch when the display screen is in a vertical screen state.

2. The vehicle-mounted display screen device according to claim 1, wherein the first semi-clutch is connected to the first shaft via splines.

3. The vehicle-mounted display screen device according to claim 1, wherein the second semi-clutch is connected to the second shaft via interference fit.

4. The vehicle-mounted display screen device according to claim 1, wherein the second semi-clutch is connected to the second shaft via splines.

5. The vehicle-mounted display screen device according to claim 1, wherein an annular boss extending along a circumferential direction of the first shaft is formed on the first shaft, and the elastic component is disposed between the first semi-clutch and the annular boss.

6. The vehicle-mounted display screen device according to claim 1, wherein the transmission system comprises a speed reducer, the motor is in transmission connection with the speed reducer, the first shaft is in transmission connection with an output shaft of the speed reducer, and the second shaft is fixed on the display screen.

7. The vehicle-mounted display screen device according to claim 6, wherein the first shaft is provided with a central shaft hole, an internal spline is formed on a hole wall of the central shaft hole, and the output shaft of the speed reducer is provided with an external spline engaged with the internal spline.

8. The vehicle-mounted display screen device according to claim 1, wherein the fixed rack is provided with mounting holes, bearings are disposed in the mounting holes, and the first shaft is supported on the fixed rack via the bearings.

9. The vehicle-mounted display screen device according to claim 8, wherein the bearings comprise a first bearing and a second bearing which are disposed in a spaced manner along an axial direction of the first shaft.

10. The vehicle-mounted display screen device according to claim 9, wherein an annular boss extending along the circumferential direction of the first shaft is formed on the first shaft, one side of the first bearing away from the second bearing abuts against the annular boss, a positioning shaft sleeve is disposed between the first bearing and the second bearing, and one side of the second bearing away from the first bearing is fixed via a circlip for the shaft.

11. The vehicle-mounted display screen device according to claim 9, wherein the vehicle-mounted display screen device further comprises a motor controller; the motor controller is configured to receive a display screen rotating instruction, then to control the motor to rotate forward until the contact terminal is in contact with the second contact switch when the contact terminal is in contact with the first contact switch control the motor to rotate backward until the contact terminal is in contact with the first contact switch when the contact terminal is in contact with the second contact switch.

12. The vehicle-mounted display screen device according to claim 9, wherein the vehicle-mounted display screen device further comprises a bracket behind the screen fixed on a back surface of the display screen, the second shaft and the bracket behind the screen are integrally formed, and the contact terminal is fixed on the bracket behind the screen.

13. A vehicle, comprising the vehicle-mounted display screen device according to claim 12.

14. The vehicle-mounted display screen device according to claim 2, wherein the second semi-clutch is connected to the second shaft via interference fit.

15. The vehicle-mounted display screen device according to claim 2, wherein the second semi-clutch is connected to the second shaft via splines.

16. The vehicle-mounted display screen device according to claim 3, wherein the second semi-clutch is connected to the second shaft via splines.

17. The vehicle-mounted display screen device according to claim 2, wherein an annular boss extending along a circumferential direction of the first shaft is formed on the first shaft, and the elastic component is disposed between the first semi-clutch and the annular boss.

18. The vehicle-mounted display screen device according to claim 3, wherein an annular boss extending along a circumferential direction of the first shaft is formed on the first shaft, and the elastic component is disposed between the first semi-clutch and the annular boss.

* * * * *